No. 676,589. Patented June 18, 1901.
S. H. SHIPMAN.
DRAFT EQUALIZER.
(Application filed Feb. 5, 1901.)
(No Model.)
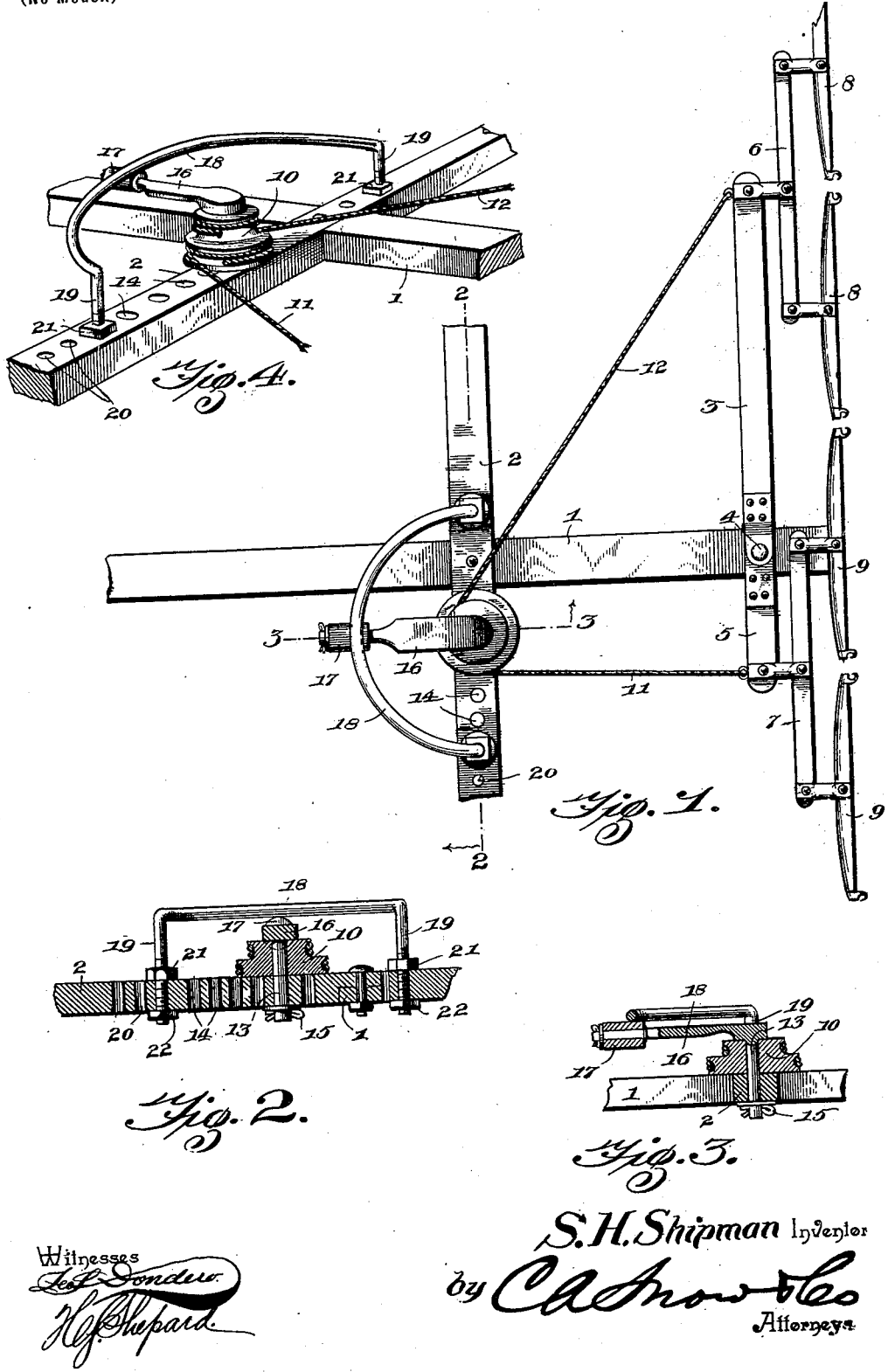
S. H. Shipman Inventor

UNITED STATES PATENT OFFICE.

SAMUEL H. SHIPMAN, OF WAXAHACHIE, TEXAS.

DRAFT-EQUALIZER.

SPECIFICATION forming part of Letters Patent No. 676,589, dated June 18, 1901.

Application filed February 5, 1901. Serial No. 46,132. (No model.)

*To all whom it may concern:*

Be it known that I, SAMUEL H. SHIPMAN, a citizen of the United States, residing at Waxahachie, in the county of Ellis and State of Texas, have invented a new and useful Draft-Equalizer, of which the following is a specification.

This invention relates to draft-equalizers, and has for its object to provide an improved device of this character which is especially applicable to agricultural machines, so as to drive a plurality of animals abreast, and is arranged so that neither of the animals need travel upon ploughed ground. It is furthermore designed to obviate the usual unnecessary looseness of the draft connections and to provide for an adjustable tension upon the connection between the opposite equalizing-bars.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a top plan view of a draft-equalizing apparatus constructed and arranged in accordance with the present invention. Fig. 2 is a detail cross-sectional view taken on the line 2 2 of Fig. 1. Fig. 3 is a detail sectional view taken on the line 3 3 of Fig. 1. Fig. 4 is a detail perspective view of the means for placing a tension upon the connection between the equalizing-bars.

Like characters of reference designate corresponding parts in all of the figures of the drawings.

Referring to the drawings, 1 designates a support—as, for instance, a draw bar or beam—and 2 a cross-bar projecting at opposite sides of the support and may be formed by an axle of the device to which the equalizer may be applied. At the forward end of the draw-bar or support there is provided a long equalizing-bar 3, having its inner end fulcrumed to the support, as at 4, and projecting transversely at one side thereof. An opposite short equalizing-bar 5 lies wholly upon the opposite side of the support and is fulcrumed thereto by means of the pivot-pin or connection 4, which is thereby common to both equalizing-bars. To the outer free ends of the equalizing-bars there are connected the respective doubletrees 6 and 7, which are provided with suitable terminal draft connections 8 and 9, respectively.

In rear of the equalizing-bars and mounted upon the cross-bar 2 is a stepped or double pulley 10, which is located upon the same side of the support 1 as is the short equalizing-lever, and therefore at one side of the fulcrum-support thereof. The lower pulley section or member is of greater diameter than the upper section, and both sections have grooved peripheral edges for the reception of the respective flexible cables 11 and 12, of which the cable 11 extends from the outer free end of the short equalizing-bar to the lower and larger member or part of the pulley, while the opposite cable 12 extends from the outer free end of the long equalizing-bar to the upper and smaller part of the pulley. These pulley members or sections are preferably formed integral and in any event should be rigidly connected so as to rotate simultaneously in the same direction, whereby one cable is coiled thereon while the other is uncoiling therefrom, and vice versa.

To mount the pulley, it is provided with a spindle 13, which is fixed thereto and projects at the lower side thereof, so as to be rotatably mounted in one of a series of openings 14, formed vertically through one end portion of the cross-bar 2. Any suitable means may be fitted to the lower projecting end of the spindle to prevent accidental upward displacement thereof—as, for instance, a pin or key 15. To the upper projecting end of the spindle there is fixedly applied a radial arm 16, which normally extends in rear of the pulley and is provided at its outer free extremity with a friction-roller 17, that is designed to travel in frictional engagement with the under side of a yoke-shaped bridge or bar 18, that is disposed substantially horizontally and has its opposite ends provided with pendent legs 19, that extend through suitable openings 20 in the cross-bar 2 and are connected thereto by means of the upper and lower nuts 21 and 22, that embrace the cross-bar, so as to fixedly mount the bridge, and also provide for a vertical adjustment thereof, whereby a variable tension may be applied to the double pulley and in turn upon the cables 11 and 12, forming the connection between the two equalizing-bars. By this arrangement the draft connections are relieved of their usual unnecessary looseness and the equalizing-bars may be adjusted to swing with a greater or less degree of looseness, as the occasion may require.

It will be understood that the double pulley and the friction-bridge may be adjusted in opposite directions transversely of the support 1 by reason of the plurality of perforations in the cross-bar 2, and the leg portions of the bridge form stops to be engaged by the arm 16, and thereby limit the rotation of the pulley.

What is claimed is—

1. In a draft-equalizing apparatus, the combination with a support, of an equalizing-bar fulcrumed thereon, a pulley mounted in rear thereof, a cable connection between the bar and the pulley, and means for applying an adjustable tension upon the pulley to retard the rotation thereof.

2. In a draft-equalizing apparatus, the combination with an equalizing pivotally-mounted bar, a rotatable pulley in rear thereof, and a cable connection between the bar and the pulley, of an adjustable tension device in frictional engagement with the pulley, and constructed to retard the rotation thereof.

3. In a draft-equalizing apparatus, the combination with a pivotal equalizing-bar, a rotatable pulley in rear thereof, and a cable connection between the bar and the pulley of a lateral arm connected to and movable with the pulley, and an arcuate bridge-bar in frictional engagement with the arm.

4. In a draft-equalizing apparatus, the combination with a support, a pivotal equalizing-bar mounted thereon, a pulley mounted in rear thereof, and a cable connection between the bar and the pulley, of a radial arm connected to and movable with the pulley, and an arcuate bridge-bar in frictional engagement with the arm, and having terminal legs adjustably mounted upon the support.

5. In a draft-equalizing apparatus, the combination with a support, having a cross-bar, of an equalizing-bar pivotally mounted upon the support in advance of the cross-bar, a pulley mounted upon the cross-bar, a cable connection between the equalizing-bar and the pulley, a radial arm fixedly connected to and movable with the pulley, and having a friction-roller, a horizontally-disposed arcuate friction-bar extending across and in engagement with the upper side of the friction-roller of the arm, and having terminal legs which pass loosely through openings in the cross-bar, and pairs of nuts upon the respective legs and embracing the cross-bar, whereby the arcuate bridge may be vertically adjusted.

6. In a draft-equalizing apparatus, the combination with a support, having a cross-bar, of a long equalizing-bar fulcrumed at its inner end to the support and located in advance of and opposite the cross-bar, a short equalizing-bar also fulcrumed to the support and projecting laterally in the same direction as the cross-bar, a double pulley having pulley members of different diameters and rotatably mounted upon the cross-bar outwardly from the fulcrums of the equalizing-bars, a cable connection between the outer free end of the long equalizing-bar and the smaller pulley-sections, an opposite cable connection between the free end of the short equalizing-bar and the larger pulley-section, a radial arm projecting rearwardly from the upper side of the pulley, and having a friction-roller, a substantially horizontal arcuate frictional bridge-bar extending transversely across and in frictional engagement with the upper side of the friction-roller, and having terminal upright legs passed loosely through corresponding openings in the cross-bar, and pairs of nuts fitted to the legs and embracing the cross-bar, whereby the bridge may be vertically adjusted.

In testimony that I claim the foregoing as my own I have hereto affixed my signature in the presence of witnesses.

SAMUEL H. SHIPMAN.

Witnesses:
  O. H. CHAPMAN,
  B. F. JAMES,
  J. E. COLEMAN.